US009003553B2

(12) United States Patent
Koeten et al.

(10) Patent No.: US 9,003,553 B2
(45) Date of Patent: Apr. 7, 2015

(54) VIEWING CONTENT UNDER ENTERPRISE DIGITAL RIGHTS MANAGEMENT WITHOUT A CLIENT SIDE ACCESS COMPONENT

(75) Inventors: Robert Koeten, Mountain View, CA (US); Brian Witten, Hermosa Beach, CA (US)

(73) Assignee: Symantec Corporation, Mountain View, CA (US)

( * ) Notice: Subject to any disclaimer, the term of this patent is extended or adjusted under 35 U.S.C. 154(b) by 791 days.

(21) Appl. No.: 12/557,424

(22) Filed: Sep. 10, 2009

(65) Prior Publication Data

US 2011/0061110 A1  Mar. 10, 2011

(51) Int. Cl.
G06F 21/62  (2013.01)
(52) U.S. Cl.
CPC .... G06F 21/6209 (2013.01); *G06F 2221/2141* (2013.01)
(58) Field of Classification Search
CPC ............... G06F 21/6209; G06F 2221/2141
USPC ...................................... 726/26–28
See application file for complete search history.

(56) References Cited

U.S. PATENT DOCUMENTS

| 2002/0038296 | A1* | 3/2002 | Margolus et al. ............. 707/1 |
| 2002/0059144 | A1* | 5/2002 | Meffert et al. ............. 705/51 |
| 2003/0167392 | A1* | 9/2003 | Fransdonk ................. 713/156 |
| 2006/0015399 | A1* | 1/2006 | Alberth et al. ............. 705/14 |
| 2007/0185815 | A1  | 8/2007 | Boccon-Gibod et al. |
| 2008/0133416 | A1  | 6/2008 | Rhoads |
| 2008/0140433 | A1  | 6/2008 | Levy et al. |

FOREIGN PATENT DOCUMENTS

| CN | 101247391 A | 8/2008 |
| CN | 1014907 A | 4/2009 |
| WO | WO 01/84271 A2 | 11/2001 |
| WO | PCT/US10/48470 | 12/2010 |

OTHER PUBLICATIONS

Extended European Search Report for European counterpart Application No. 10816180.3 dated Mar. 7, 2013.
English language summary and translation of relevant portions of Japanese Office Action for Japanese counterpart Application No. 2012-528129 dated Sep. 3, 2013, 4 pages.
(Continued)

*Primary Examiner* — Chau Le
(74) *Attorney, Agent, or Firm* — Brill Law Office; Jeffrey Bill

(57) ABSTRACT

An E-DRM remote caching system enables a user without a client side E-DRM access component to view E-DRM governed content on a variety of client devices. The user transmits inaccessible E-DRM governed content to be viewed to a the remote caching system. The remote system receives the content, temporarily stores it in a cache, and determines whether the user has sufficient rights to view the content. If the user does have sufficient access rights, the remote system transforms the content into a secure, viewable format and securely transmits it to the user. The user can view the E-DRM governed content without an E-DRM client side access component. The E-DRM remote caching system can add a unique digital marker to received content. The marker can be subsequently used to identify the origin of compromised content.

19 Claims, 4 Drawing Sheets

(56) References Cited

OTHER PUBLICATIONS

English language translation of relevant portions of Chinese Office Action for Chinese counterpart Application No. 201080039756.7 dated Mar. 11, 2014, 23 pages, translated by Jeekai & Partners Attorneys.

English language translation of relevant portions of Chinese Office Action for Chinese counterpart Application No. 201080039756.7 dated Nov. 15, 2014, 5 pages, translated by Jeekai & Partners Attorneys.

* cited by examiner

VIEWING CONTENT UNDER ENTERPRISE DIGITAL RIGHTS MANAGEMENT WITHOUT A CLIENT SIDE ACCESS COMPONENT

TECHNICAL FIELD

This disclosure pertains generally to computer enterprise digital rights management systems, and more specifically to enabling users without a client side access component to view content under enterprise digital rights management.

BACKGROUND

Enterprise digital rights management (E-DRM or ERM) refers to applying access control to digital content at an enterprise level (e.g., a corporation, university, government department, etc.). E-DRM, also sometimes called Information Rights Management (IRM), is generally intended to prevent the unauthorized use of digital content which is proprietary to an enterprise. Under an E-DRM system, governed content is typically encrypted or otherwise made inaccessible. Attempts to access governed content are managed by the E-DRM system, which only allows users permitted levels of access to permitted content. Specific levels of access (e.g., read, write, copy, execute, etc.) to specific digital content can be provided to specific users or groups.

E-DRM systems conventionally require the deployment of a client E-DRM access component on each governed computing device. The client E-DRM access component intercepts and manages attempts by the client to access local digital content under E-DRM control. Such local content can include governed content created and/or stored on the client. By intercepting and managing access requests, the client E-DRM access component provides only permitted access to permitted content to the user.

Situations occur in which it is desirable for a user to access E-DRM controlled content, but a client E-DRM access component is not available. Examples include a user operating a smart phone or other portable computing device without a client E-DRM access component, a user in the field accessing the Internet from a shared or public computer, a user operating a home computer, etc.). It would be desirable to address these issues.

SUMMARY

An E-DRM remote caching system enables a user without a client side enterprise digital rights management access component to view content under enterprise digital rights management. A user operating a computing device (e.g., a client) without a client side enterprise digital rights management access component transmits encrypted (or otherwise inaccessible) E-DRM governed content to be viewed to an E-DRM remote caching system, running, for example, on a server. The E-DRM remote caching system receives the E-DRM governed content and temporarily stores it in a cache. How long to store the content in the cache can be based on criteria such as specified duration, number of accesses, number or identity of accessing users, etc. The E-DRM remote caching system determines whether the user has sufficient access rights to view the cached content. This can comprise determining whether the user has read access, or whether the user has special E-DRM remote caching system granted access privileges, such as the right to view the E-DRM governed content without a client side enterprise digital rights management access component, access based on geographical location, access based on network location, access based on computing device type, and/or access based on the current time. If the user does have sufficient access rights to view the E-DRM governed content, the E-DRM remote caching system transforms the content into a secure, viewable format (e.g., secure pdf, flash based DRM, etc.) and securely transmits it to the user. This enables the user to view the E-DRM governed content without a client side enterprise digital rights management access component.

In some embodiments, the E-DRM remote caching system embeds an address in the clear to which to send the content for viewing (e.g., an email address, a URL, etc.) in otherwise encrypted E-DRM governed content. This embedded address can then be evoked automatically to send the content to the E-DRM remote caching system.

In some embodiments, the user transmits the actual E-DRM governed content to the E-DRM remote caching system. In other embodiments, the user transmits an identifier of the content, such as a hash. In this case, the E-DRM remote caching system determines whether the content is locally accessible, e.g., because it is already in the cache, or included in a locally accessible backup or archival system. If the content is locally accessible, the E-DRM remote caching system obtains the content locally, thereby saving transmission time and improving performance. If not, the E-DRM remote caching system obtains the content from the user.

In some embodiments, the E-DRM remote caching system adds a unique digital marker (a fingerprint) to received E-DRM governed content. The unique digital marker can be subsequently used to identify the origin of compromised E-DRM governed content viewed by a user without a client side enterprise digital rights management access component.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
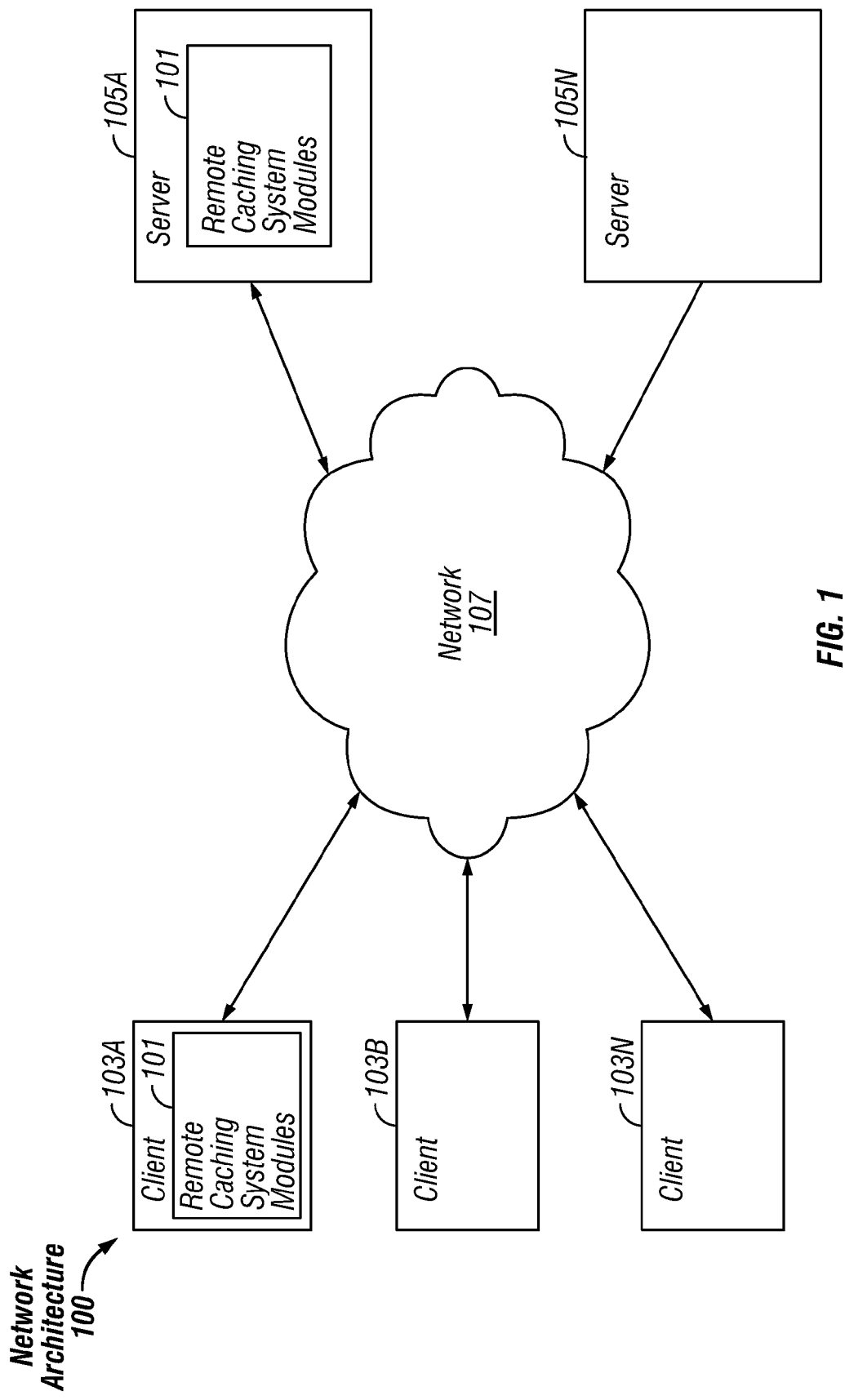
FIG. 1 is a block diagram of an exemplary network architecture in which an E-DRM remote caching system can be implemented, according to some embodiments.

FIG. 1 is a block diagram illustrating an exemplary network architecture 100 in which an E-DRM remote caching system 101 can be implemented. The illustrated network architecture 100 comprises multiple clients 103A, 103B and 103N, as well as multiple servers 105A and 105N. In FIG. 1, the E-DRM remote caching system 101 is illustrated as being distributed between server 105A and client 103A. It is to be understood that this is an example only, and in various embodiments various functionalities of this system 101 can be instantiated on a client 103, a server 105 or otherwise distributed between multiple clients 103 and/or servers 105. It is to be understood further that although functionalities of the E-DRM remote caching system 101 can be instantiated on a client 103, under this system 101 the client 103 does not contain (or at least does not need) a client side enterprise digital rights management access component.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments, for example a public, private or corporate LAN, WAN, WiFi-network or combination thereof. In some embodiments, the network 107 can be in the form of one or more types of cellular/mobile network(s) (e.g., CDMA, GSM, iDEN) and/or data service(s) (e.g., GPRS, PDC-P, CDPD, 3G, 4G, etc.).

Figure 2:
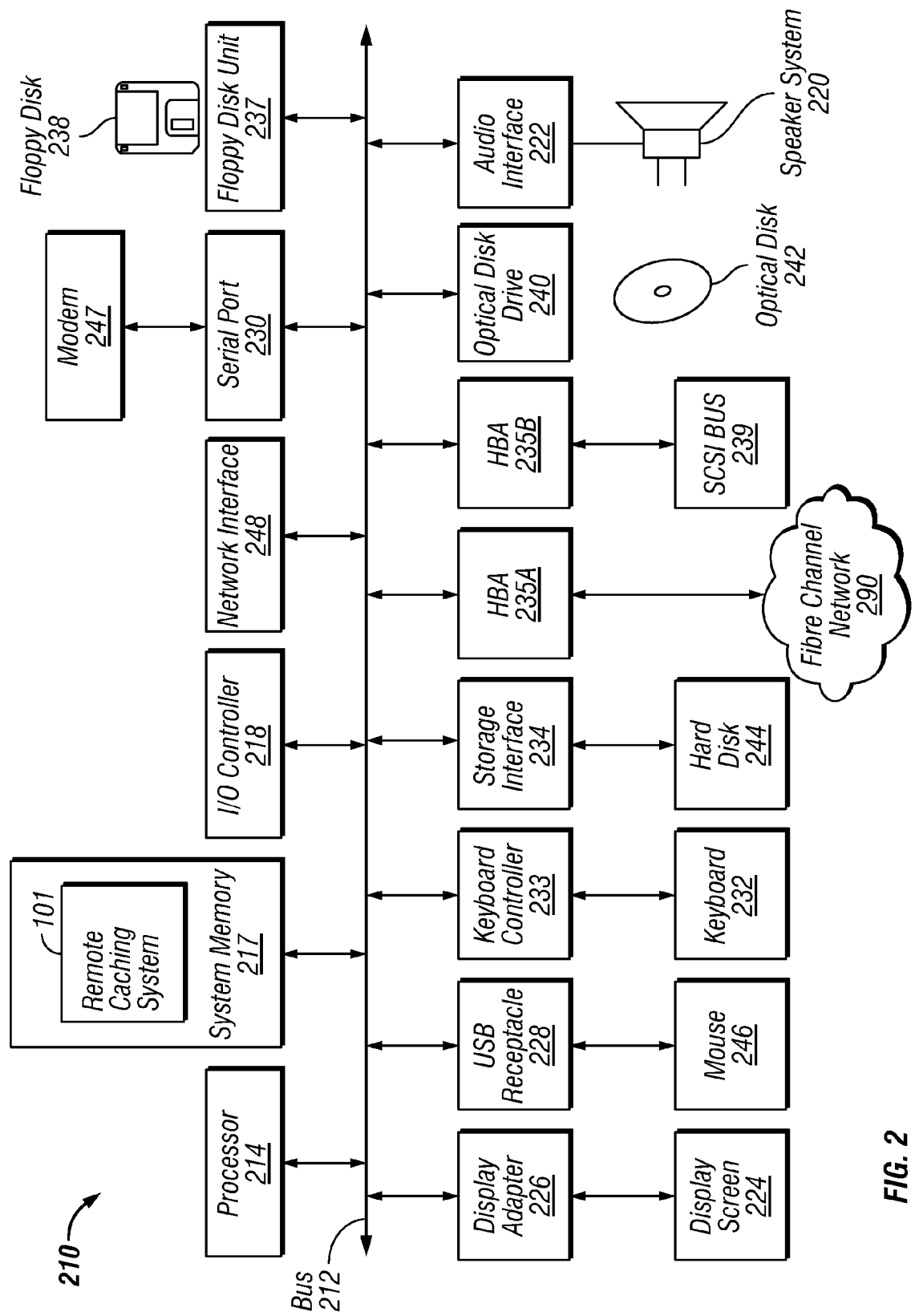
FIG. 2 is a block diagram of a computer system suitable for implementing an E-DRM remote caching system, according to some embodiments.

FIG. 2 is a block diagram of a computer system 210 suitable for implementing an E-DRM remote caching system 101. Both clients 103 and servers 105 can be implemented in the form of such computer systems 210. It is to be understood that a computer system 210 can comprise a desktop or laptop computer, but can also be in the form of any other type of computing device, such as a mobile phone, a smart phone, a personal digital assistant, a game device, a thin-client, a netbook computer, an internet television device, a television with an integrated browser, etc. As explained below, the components illustrated in FIG. 2 are exemplary only, and computer systems can have fewer, more or different components as desired.

As illustrated in FIG. 2, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the E-DRM remote caching system 101 is illustrated as residing in system memory 217. The workings of the E-DRM remote caching system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
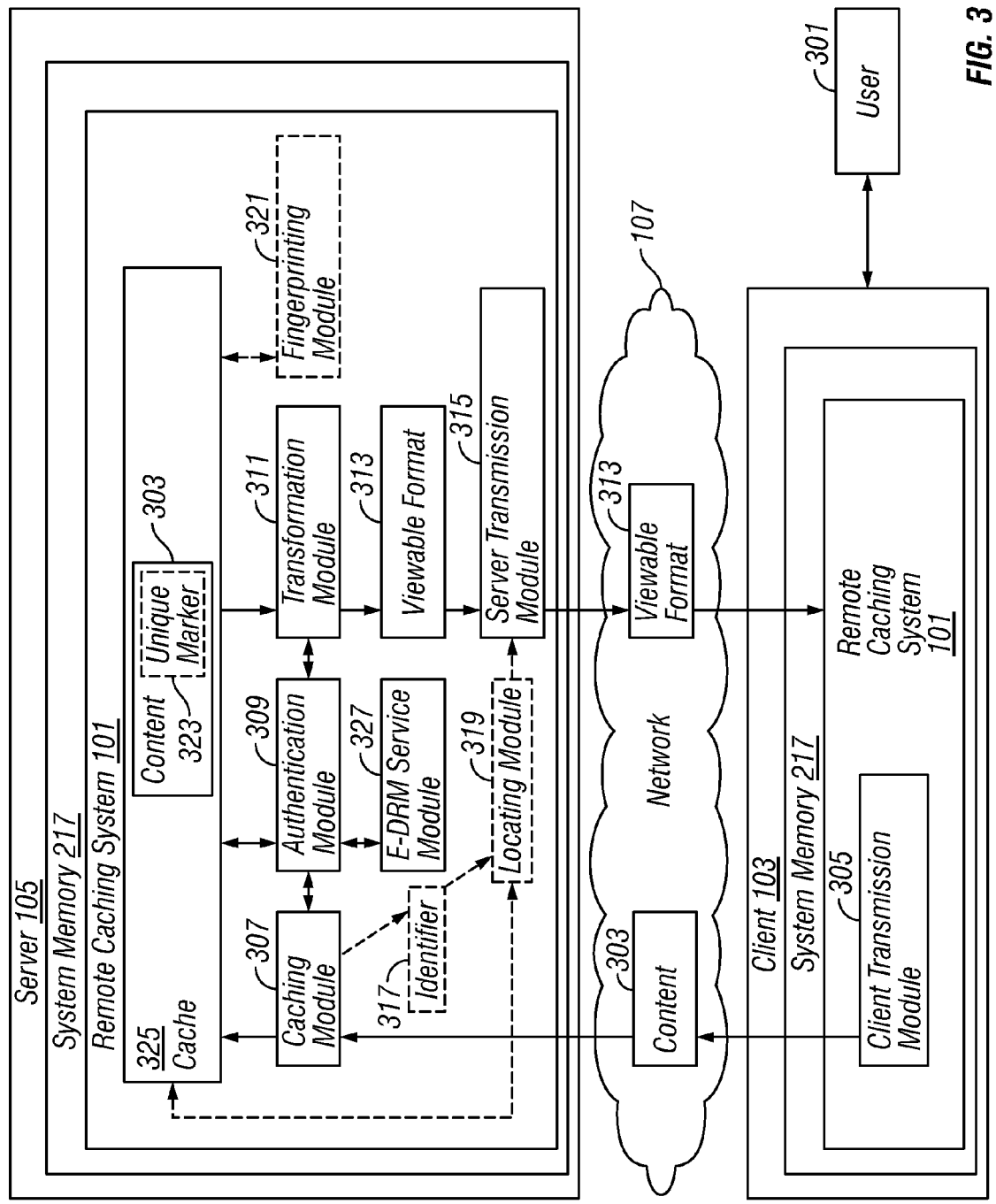
FIG. 3 is a block diagram of the operation of an E-DRM remote caching system, according to some embodiments.

FIG. 3 illustrates an E-DRM remote caching system 101, with some modules residing in the system memory 217 of a client 103 and other modules residing in the system memory 217 of a server 105. This E-DRM remote caching system 101 is illustrated as being distributed between two computer systems 210, but as described above more, fewer or different functionalities of the E-DRM remote caching system 101 can reside on a client 103, a server 105, or be otherwise distributed between multiple computer systems 210, including within a cloud-based computing environment in which the functionality of the E-DRM remote caching system 101 is provided as a service over a network 107. It is to be understood that although functionalities of the E-DRM remote caching system 101 can be instantiated on the client 103, under this system 101 the client 103 does not contain (or at least does not need) a client side enterprise digital rights management access component. It is to be understood that although the E-DRM remote caching system 101 is illustrated in FIG. 3 as a group of modules, the illustrated E-DRM remote caching system 101 represents a collection of functionalities, which can be instantiated as a single or other multiple modules as desired. It is to be understood that the modules of the E-DRM remote caching system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the E-DRM remote caching system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a user 301 of a client 103 that does not have a client E-DRM access component can still access local E-DRM governed content 303. In this scenario, the user 301 receives or otherwise obtains E-DRM governed content 303 (e.g., by remote access of the user's work computer, by email, etc.). The user 301 now has E-DRM governed content 303 locally on the client 103, but the E-DRM governed content 303 is encrypted (or otherwise inaccessible), and thus conventionally could not be accessed without the use of a client E-DRM access component.

To allow access without the use of a client E-DRM access component, a client side transmission module 305 transmits the E-DRM governed content 303 to a caching module 307 on the server 105. This can be done by emailing the E-DRM governed content 303 to an email address associated with the caching module 307. In one embodiment, this email address is embedded as clear text (e.g., XML) together with the encrypted E-DRM governed content 303. In other embodiments, this email address is gleaned by the client side transmission module 305 in other ways (e.g., provided by the user 301, stored in association with the client side transmission module 305, etc.). The E-DRM governed content 303 can also be uploaded to an address (e.g., a Uniform Resource Locator) associated with the caching module 307. This address can be embedded in the clear with the encrypted E-DRM governed content 303, or otherwise accessed by the client side transmission module 305.

Upon receipt of the E-DRM governed content 303 from the client side transmission module 305, the caching module 307 temporarily stores the content 303 in a cache 325 on the server 105. An E-DRM authentication module 309 accesses the cached E-DRM governed content 303 and communicates with an E-DRM service module 327. The E-DRM service module 327 maintains and manages information specifying which users 301 have which privileges, and uses conventional E-DRM functionality to determine whether the user 301 has access privileges to view the content 303 (read privileges). If the user 301 does not have read privileges for the E-DRM governed content 303, no access to the content 303 is provided. On the other hand, if the user does have read privileges, a content transformation module 311 transforms the encrypted (or otherwise inaccessible) cached content 303 into a secure, viewable format 313, in order to enable secure viewing by the user 301. The content transformation module 311 uses conventional techniques to transform the encrypted content into a secure, viewable format 313 (e.g., secure pdf, flash based DRM, conversion of text into graphics image, browser controls, etc.).

A server side transmission module 315 transmits the content in the secure, viewable format 313 to the client 103 for access by the user 301. To keep the E-DRM governed content 303 secure, the viewable format 313 is transmitted to the client 303 on a secure line, by using a technique such as SSL or the like. The user 301 can then read the content in the viewable format 313, e.g., in a browser (not illustrated).

Because no client E-DRM access module exists to restrict use of the E-DRM governed content 303 on the client, the viewable content 313 is provided such that it can be viewed only, but not copied, pasted, printed, modified, screen captured, etc. This is the case even when the user 301 has more than just read privileges for the E-DRM governed content 303. Without a client E-DRM access module to force compliance with whatever other rights a user 301 might have (e.g., right to copy but not modify), providing read only viewable content 313 prevents unauthorized use of the content 303 on the client 103. For example, if the user had copy privileges and was allowed to make a copy of an E-DRM governed file 303, without a client E-DRM access module being present, nothing would prevent that copy from being modified or otherwise accessed in unauthorized ways.

The caching module 309 can store the E-DRM governed content 303 in the cache 325 on the server 105 just long enough to enable the user 301 to view it, and then remove it after viewing (one-time usage). The caching module 309 can also maintain the cached E-DRM governed content 303 according to desired criteria (e.g., for a given period of time, until viewed by the user 301 a given number of times, until accessed by each or a certain percentage or number of users 301 within a given group, etc.).

In some embodiments, a new E-DRM privilege is defined providing or denying the explicit right to view E-DRM governed content 303 without a client E-DRM access module. In other words, rather than simply allowing such access to any user 301 with at least read privileges to the E-DRM governed content 303, specific users 301 could be extended and/or denied this special level of access by the E-DRM remote caching system 101. In such embodiments, the E-DRM service module 327 maintains and manages information concerning which users 301 have this new E-DRM privilege, and the E-DRM authentication module 309 only allows access to cached E-DRM governed content 303 to users 301 with this level of access privilege.

In some embodiments, the E-DRM authentication module 309 limits access to cached E-DRM governed content 303 based on the geographical and/or network location of the user 301. For example, such access could be provided only to users 301 located in certain countries, at certain office locations, accessing the server 105 via an intranet as opposed to the Internet, from certain subnets, from a mobile as opposed to fixed location computing device, etc. The E-DRM authentication module 309 can also limit access based upon, e.g., the type of computing device 210 being operated by the user 301, or upon time (e.g., access only permitted during business hours, only on weekends, etc.). The level of granularity to which to limit access based on such factors is a variable design parameter.

It is to be understood that performance time could be significantly improved if the specific E-DRM governed content 303 to be accessed were already present in a cloud/service environment in which the server 105 is located. If this were the case, the client side transmission module 305 would not need to transmit the E-DRM governed content 303 to the caching module 307 on the server 105, thereby improving the speed of the overall process. It is to be understood that the E-DRM remote caching system 101 does not operate as a repository for all E-DRM governed content 303, but instead as a caching system for specific E-DRM governed content 303 that is being accessed as described above. However, there are a number of possible situations in which specific E-DRM governed content 303 that a user 301 wishes to access is already accessible to the server 105 without requiring an upload of that content 303 from the client 103. This could be the case, for example, if an individual user or enterprise wide cloud based backup or archiving system were in place, within the same backend context in which the server 105 is located. Under that scenario, the specific E-DRM governed content 303 sought by the user 301 could already be in the backup or archiving system. Another possibility is that the specific E-DRM governed content 303 a user 301 is attempting to access could still be present in the cache 325, because it was stored there earlier and has not yet been removed according to the caching criteria in place as described above.

Therefore, in some embodiments, it is determined whether specific E-DRM governed content 303 that a user 301 attempts to access is already present on the server 105 side. In such embodiments, the client side transmission module 305 transmits an identifier 317 of the content 303 (e.g., a hash) to the caching module 307, which passes the identifier 317 to a content locating module 319. The content locating module 319 checks the server side for the presence of the specific E-DRM governed content 303 being sought by the user 301. If the content 303 is located on the server side, it is stored in the cache 325 (unless it is located in the cache 325 already), and processing proceeds from that point as described above. If the content 303 is not located on the server side, the server side transmission module 315 transmits a corresponding notification (not illustrated) back to the client side transmission module 305. The client side transmission module 305 responds by transmitting the content 303 to the server 105, and processing proceeds from that point as described above.

In some embodiments, a fingerprinting module 321 adds a unique digital marker 323 (fingerprint) to each instance of E-DRM governed content 303 stored in the cache 325. FIG. 3 illustrates the fingerprinting module 321 as residing on the server 105, but in other embodiments the fingerprinting module 321 can reside on the client 103 or be distributed between multiple computing devices as desired. The unique digital marker 323 can identify the user 301, the content 303, the time of transmission and/or the computing device (the client 103) from which it was transmitted. More specifically, the unique digital marker 323 can comprise a single purpose or single use fingerprint, to reflect that the particular fingerprinted viewable content 313 was accessed by a specific user 301 at a specific date/time, from a specific client device 103. By fingerprinting the content 303, if any of the E-DRM governed content 303 is subsequently found to be compromised, the unique digital marker 323 can be used to unambiguously determine the origin of the compromised content 303.

Figure 4:
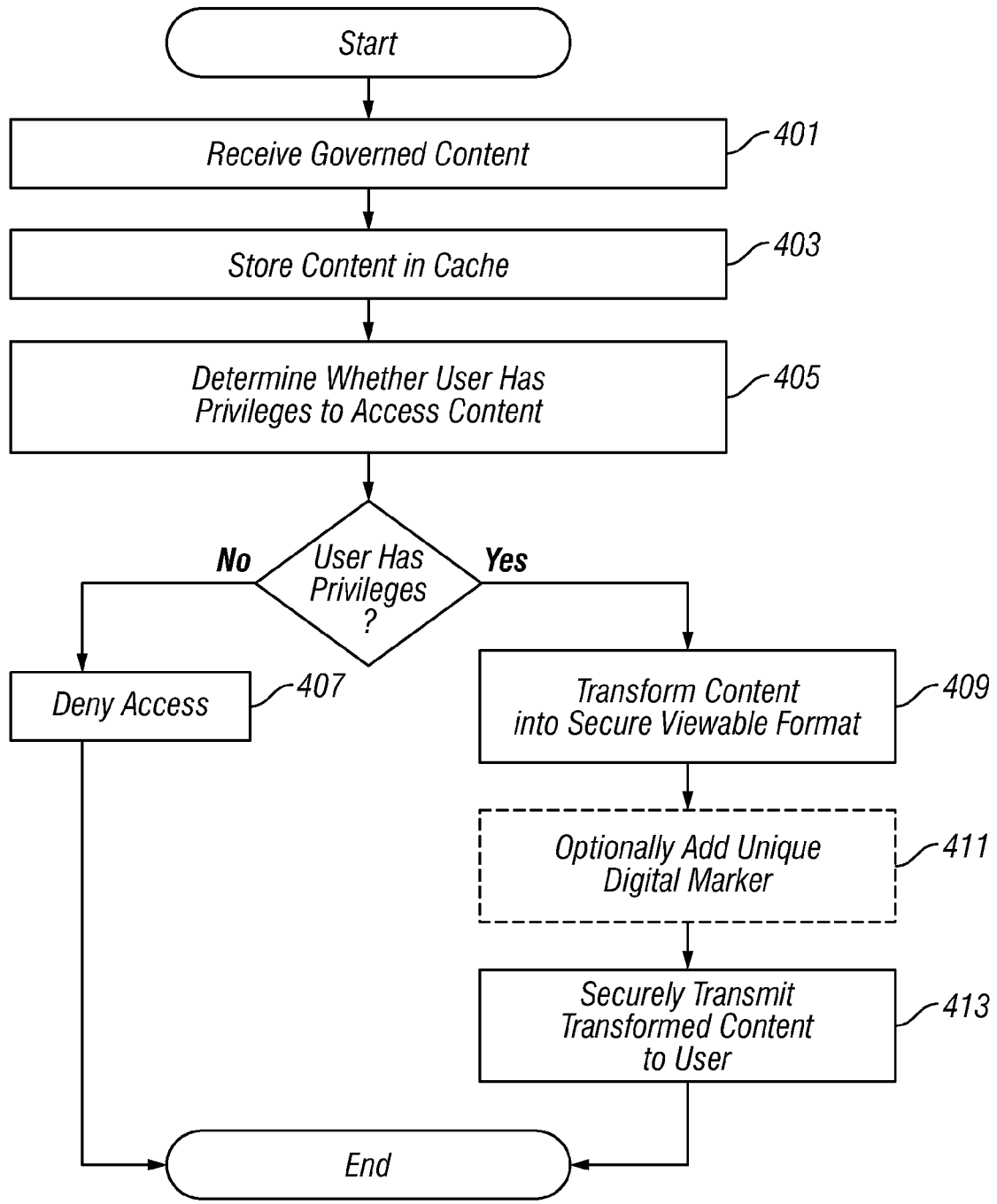
FIG. 4 is a flowchart illustrating steps for the operation of an E-DRM remote caching system, according to some embodiments.

FIG. 4 illustrates steps for the operation of an E-DRM remote caching system 101 (FIG. 1), according to some embodiments. The caching module 307 (FIG. 3) receives 401 E-DRM governed content 303 (FIG. 3) to access from a user 301 (FIG. 3) without a local, client E-DRM access component. The caching module 307 (FIG. 3) stores 403 the content 303 (FIG. 3) in a cache 325 (FIG. 3) on the server 105 (FIG. 1). The E-DRM authentication module 309 (FIG. 3) determines 405 whether the user 301 (FIG. 3) has read privileges for the content 303 (FIG. 3). If the user 301 (FIG. 3) does not have read privileges for the content 303 (FIG. 3), access to the content 303 (FIG. 3) is denied 407 to the user 301 (FIG. 3). If the user 301 (FIG. 3) does have read privileges, the content transformation module 311 (FIG. 3) transforms 409 the cached content 303 (FIG. 3) into a secure, viewable format 313 (FIG. 3), and optionally adds 411 a unique digital marker 323 (FIG. 3) to the transformed content 313 (FIG. 3). The server side transmission module 315 (FIG. 3) securely transmits 413 the content in the secure, viewable format 313 (FIG. 3) to the client 103 (FIG. 1), so as to provide read only access to the user 301 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for enabling a user without a client side enterprise digital rights management (E-DRM) access component to view content under enterprise digital rights management, the method comprising the steps of:
   receiving from a remotely located user device without a client side enterprise digital rights management access component, by a computer, encrypted content identified as governed by an enterprise digital rights management system;
   temporarily storing, by the computer, the identified content governed by the enterprise digital rights management system in a cache;
   determining from a predefined E-DRM privilege, by the computer, whether the user device has sufficient access rights to view the encrypted content without a client side enterprise digital rights management access component;
   determining whether the user device is located in a location that allows access rights to view the encrypted content without a client side enterprise digital rights management access component;
   responsive to determining that the user device has sufficient access rights to view the identified content governed by the enterprise digital rights management system and that the user device is located at location that allows access rights to view the identified content, transforming the identified content into a secure, viewable format, by the computer, wherein the user device has more than read-only rights relative to the identified content but is restricted to read-only rights responsive to viewing the identified content without a client side enterprise digital rights management access component; and
   securely transmitting the identified content back to the user device in the secure, viewable format to the user device, such that the user device can view the identified content governed by the enterprise digital rights management system without a client side enterprise digital rights management access component.

2. The method of claim 1 further comprising:
   embedding, by the computer, an address in the clear in content governed by the enterprise digital rights management system, the embedded address comprising an address to which to transmit the identified content governed by the enterprise digital rights management system for viewing without a client side enterprise digital rights management access component; and
   wherein receiving, by the computer, the at least an identifier of content governed by the enterprise digital rights management system from the user device without a client side enterprise digital rights management access component further comprises receiving the identified content governed by the enterprise digital rights management system as a result of the identified content being transmitted to the embedded address.

3. The method of claim 1 wherein receiving, by the computer, the at least an identifier of content governed by the enterprise digital rights management system from the user device further comprises:
   receiving, by the computer, an identifier of the identified content governed by the enterprise digital rights management system from the user device;
   determining whether the identified content governed by the enterprise digital rights management system is locally accessible to the computer; and
   obtaining, by the computer, the identified content governed by the enterprise digital rights management system according to whether the identified content is locally accessible to the computer.

4. The method of claim 3 wherein obtaining, by the computer, the identified content governed by the enterprise digital rights management system according to whether the identified content is locally accessible to the computer further comprises:
   determining that the identified content governed by the enterprise digital rights management system is locally accessible to the computer; and
   obtaining, by the computer, the identified content governed by the enterprise digital rights management system locally.

5. The method of claim 1 wherein temporarily storing, by the computer, identified content governed by the enterprise digital rights management system in the cache further comprises:
   temporarily storing, by the computer, identified content governed by the enterprise digital rights management system in the cache according to at least one criterion from a group of criteria consisting of: an occurrence of a given amount of time, a number of times the identified content is viewed, a number of users viewing the identified content and identities of users viewing the identified content.

6. The method of claim 1 wherein determining, by the computer, that the user device has sufficient access rights to view the identified content governed by the enterprise digital rights management system further comprises:
   determining, by the computer, that the user device has at least one privilege under the enterprise digital rights management system concerning the identified content from a group of privileges consisting of: read access, access based on geographical location, access based on network location, access based on computing device type, access based on frequency of previous access, access based on amount of previous access and access based on current time.

7. The method of claim 1 further comprising:
   granting, to at least one user device, by the computer, at least one privilege under the enterprise digital rights management system concerning at least some content governed by the enterprise digital rights management system from a group of privileges consisting of: view without a client side enterprise digital rights management access component access, access based on geographical location, access based on network location, access based on computing device type, access based on frequency of previous access, access based on amount of previous access and access based on current time.

8. The method of claim 1 further comprising:
   adding, by the computer, a unique digital marker to at least some instances of identified content governed by the enterprise digital rights management system; and
   responsive to an instance of identified content transmitted to the user device without a client side enterprise digital rights management access component subsequently being compromised, using, by the computer, an added unique digital marker to determine an origin of the compromised content.

9. The method of claim 1 wherein determining, by the computer, that the user device has sufficient access rights to view the identified content governed by the enterprise digital rights management system further comprises:
   determining that the user device is privileged under the enterprise digital rights management system to view the identified content without an enterprise digital rights management access component.

10. At least one non-transitory computer readable storage medium storing a computer program product for enabling a user without a client side enterprise digital rights management (E-DRM) access component to view content under enterprise digital rights management, the computer program product comprising:
    program code for receiving from a remotely located user device without a client side enterprise digital rights management access component, by a computer, encrypted content identified as governed by an enterprise digital rights management system;
    program code for temporarily storing, by the computer, the identified content governed by the enterprise digital rights management system in a cache;
    program code for determining from a predefined E-DRM privilege, by the computer,
       whether the user device has sufficient access rights to view the encrypted content without a client side enterprise digital rights management access component; and
       whether the user device is located in a location that allows access rights to view the encrypted content without a client side enterprise digital rights management access component;
    responsive to determining that the user device has sufficient access rights to view the identified content governed by the enterprise digital rights management system and that the user device is located at location that allows access rights to view the identified content, program code for transforming the identified content into a secure, viewable format, by the computer, wherein the user device has more than read-only rights relative to the identified content but is restricted to read-only rights responsive to viewing the identified content without a client side enterprise digital rights management access component; and
    program code for securely transmitting the identified content back to the user device in the secure, viewable format to the user device, such that the user device can view the identified content governed by the enterprise digital rights management system without a client side enterprise digital rights management access component.

11. The computer program product of claim 10 further comprising:
    program code for embedding an address in the clear in content governed by the enterprise digital rights management system, the embedded address comprising an address to which to transmit the identified content governed by the enterprise digital rights management system for viewing without a client side enterprise digital rights management access component; and wherein the program code for receiving the at least an identifier of content governed by the enterprise digital rights management system from the user device without an enterprise digital rights management access component further comprises program code for receiving the identified content governed by the enterprise digital rights management system as a result of the identified content being transmitted to the embedded address.

12. The computer program product of claim 10 wherein the program code for receiving the at least an identifier of content governed by the enterprise digital rights management system from the user device further comprises:

program code for receiving an identifier of the identified content governed by the enterprise digital rights management system from the user device;

program code for determining whether the identified content governed by the enterprise digital rights management system is locally accessible; and program code for obtaining the identified content governed by the enterprise digital rights management system according to whether the identified content is locally accessible.

13. The computer program product of claim 12 wherein the program code for obtaining the identified content governed by the enterprise digital rights management system according to whether the identified content is locally accessible further comprises:

program code for determining that the identified content governed by the enterprise digital rights management system is locally accessible; and program code for obtaining the identified content governed by the enterprise digital rights management system locally.

14. The computer program product of claim 10 wherein the program code for temporarily storing identified content governed by the enterprise digital rights management system in the cache further comprises:

program code for temporarily storing identified content governed by the enterprise digital rights management system in the cache according to at least one criterion from a group of criteria consisting of: an occurrence of a given amount of time, a number of times the identified content is viewed, a number of users viewing the identified content and identities of users viewing the identified content.

15. The computer program product of claim 10 wherein the program code for determining that the user device has sufficient access rights to view the identified content governed by the enterprise digital rights management system further comprises:

program code for determining that the user has at least one privilege under the enterprise digital rights management system concerning the identified content from a group of privileges consisting of: read access, view without a client side enterprise digital rights management access component access, access based on geographical location, access based on network location, access based on computing device type, access based on frequency of previous access, access based on amount of previous access and access based on current time.

16. The computer program product of claim 10 further comprising:

program code for granting, to at least one user device at least one privilege under the enterprise digital rights management system concerning at least some content governed by the enterprise digital rights management system from a group of privileges consisting of: view without a client side enterprise digital rights management access component access, access based on geographical location, access based on network location, access based on computing device type, access based on frequency of previous access, access based on amount of previous access and access based on current time.

17. The computer program product of claim 10 further comprising:

program code for adding a unique digital marker to at least some instances of identified content governed by the enterprise digital rights management system; and program code for, responsive to an instance of identified content transmitted to the user device without a client side enterprise digital rights management access component subsequently being compromised, using an added unique digital marker to determine an origin of the compromised content.

18. A computer system for enabling a user without a client side enterprise digital rights management (E-DRM) access component to view content under enterprise digital rights management, the computer system comprising:

a processor;

system memory;

a caching module for:

receiving from a remotely located user device without a client side enterprise digital rights management access component, encrypted content identified as governed by an enterprise digital rights management system; and temporarily storing the identified content governed by the enterprise digital rights management system in a cache;

an E-DRM authentication module for:

determining from a predefined E-DRM privilege, whether the user has sufficient access rights to view the encrypted content without a local enterprise digital rights management access component; and determining whether the user device is located in a location that allows access rights to view the encrypted content without a client side enterprise digital rights management access component;

a content-transformation module for, responsive to determining that the user device has sufficient access rights to view the identified content governed by the enterprise digital rights management system and that the user device is located at location that allows access rights to view the identified content, transforming the identified content into a secure, viewable format, wherein the user device has more than read-only rights relative to the identified content but is restricted to read-only rights responsive to viewing the identified content without a client side enterprise digital rights management access component; and a server transmission module for securely transmitting the identified content back to the user device in the secure, viewable format to the user device, such that the user device can view the identified content governed by the enterprise digital rights management system without a client side enterprise digital rights management access component.

19. The computer system of claim 18 wherein the content-transformation module is further for:

adding a unique digital marker to at least some instances of identified content governed by the enterprise digital rights management system; and responsive to an instance of identified content transmitted to the user device without a client side enterprise digital rights management access component subsequently being compromised, using an added unique digital marker to determine an origin of the compromised content.

\* \* \* \* \*